United States Patent [19]

Holmes

[11] 3,859,744

[45] Jan. 14, 1975

[54] TELEPHONE INDEX DEVICE

[76] Inventor: Hedley Nixon Holmes, 36 Roundwood Ct., Agincourt, Ontario, Canada

[22] Filed: Mar. 4, 1974

[21] Appl. No.: 447,777

[52] U.S. Cl. .................................. 40/336, 312/330

[51] Int. Cl. ............................................ G09f 3/00

[58] Field of Search ...... 40/336, 65, 339; 281/15 R; 312/330

*Primary Examiner*—Robert W. Mitchell
*Assistant Examiner*—Wenceslao J. Contreras
*Attorney, Agent, or Firm*—Ridout & Maybee

[57] ABSTRACT

A telephone index device comprises an elongated drawer-like slide member adapted to carry index sheets, and a generally flat frame member constructed to support the slide member along the underside of the telephone base in drawer-like sliding manner therewith, the frame member comprising an elongated body portion of such a width as to extend between said pair of laterally spaced feet, a pair of lateral abutment portions adapted to engage said pair of feet, and a rearwardly extending flexible strap formed with an upwardly projecting resilient stud positioned to engage one of said holes when said abutment portions are located in abutting engagement with said pair of feet and adapted to snap into the hole to secure the frame member to said underside.

10 Claims, 6 Drawing Figures

TELEPHONE INDEX DEVICE

BACKGROUND OF THE INVENTION

This invention relates to telephone index devices for use with telephones of the cradle handset type.

The invention is particularly concerned with telephone index devices of the type comprising an elongated drawer-like slide member adapted to carry index sheets, which provide easy access to selected telephone data, and a generally flat frame member constructed to support the slide member along the underside of the telephone base in drawer-like sliding manner therewith, the device being attached to the telephone base in such a manner as to be mainly out of sight when not in use.

A telephone index device of this type must provide ready access to the data carried by the index sheets, and must be securely attached to the telephone base in a manner which does not contravene telephone company regulations. Moreover, it is also necessary that the attachment means of the device should not involve a design that would make its production prohibitively expensive.

The present invention provides a telephone index device of the type referred to, which is particularly well suited for use with telephones of a type presently in widespread use, namely telephones of the type having a generally rectangular base having front and rear edges, the base having an underside formed with an array of holes adjacent the rear edge and being mounted on feet including a pair of laterally spaced feet adjacent the front edge. According to the invention, the frame member of the device comprises an elongated body portion of such a width as to extend between the pair of laterally spaced feet, adjacent the front of the base, a pair of lateral abutment portions adapted to engage said pair of feet, and one or more rearwardly extending flexible straps each formed with an upwardly projecting resilient stud positioned to engage one of the holes in the underside of the telephone base when the abutment portions are located in abutting engagement with the feet and adapted to snap into the respective holes to secure the frame members to the underside. Alternatively, the resilient studs, instead of being integral with the flexible straps, may be snapped into holes in the frame member suitably located for positioning the studs.

One embodiment of the invention will now be described, by way of example, with reference to the accompanying drawings, in which, FIG. 1 shows in perspective the underside of a telephone base with the index device attached thereto;

Figures 2, 3, 4, 4A, 4B:
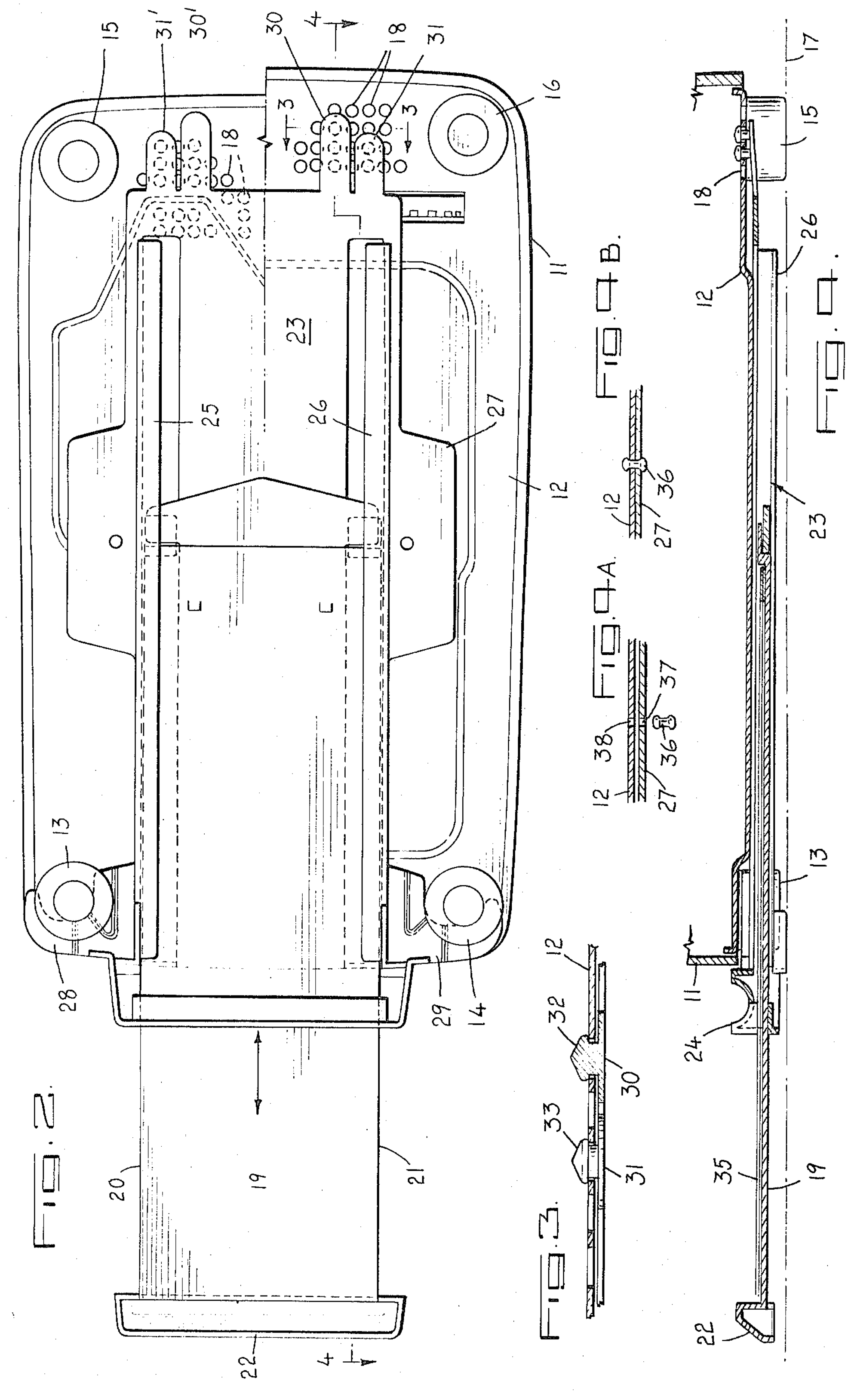
FIG. 2 is an underneath plan view of the device, the upper half of the figure showing the manner of attachment to one telephone base and the lower half of the figure showing the manner of attachment to a telephone base of a different size.
FIG. 3 is a section on line 3—3 in FIG. 2.
FIG. 4 is a section of line 4—4 in FIG. 2.
FIG. 4A illustrates a detail of a modification in which separate resilient studs are used to secure the index device to the telephone base.
FIG. 4B illustrates the detail of FIG. 4A with the index device secured to the telephone base.

Referring to the drawings, the telephone is of the cradle handset type having a generally rectangular base 10 comprising a cover 11 which extends down over and around the periphery of a base plate 12. The base 10 has four rectangularly disposed supporting feet 13, 14, 15, 16, which space the underside of the base plate 12 from a supporting surface 17 (FIG. 4). The base plate is formed with an array of circular holes 18 adjacent the rear edge of the base, (the corresponding holes of the smaller base shown in the upper half of FIG. 2 being denoted by the numeral 18').

The index device comprises an elongated drawer-like slide member 19 adapted to carry index sheets 35, (FIG. 4) in the known manner, the slide member being of flat rectangular configuration providing a pair of longitudinally extending parallel marginal edges 20, 21. The slide member is of moulded plastics material having an integrally moulded handle formation 22 at its front end. The device also includes a generally flat, frame member 23, which is constructed to support the slide member 19 along the underside of the telephone base in drawerlike sliding manner therewith. The frame member 23 is an integrally moulded structure of plastics material and is formed with a transverse portion 24 at its front end defining a transverse slot through which the slide member 19 extends. The frame member also has a pair of integral, longitudinally extending, ledge portions 25, 26 which support the slide member and guide its longitudinal movement.

The manner in which the frame member is adapted to be attached to the underside of the telephone base will now be described. The member comprises an elongated body portion 27 of such a width as to extend between the laterally spaced feet 13, 14, and is formed with a pair of lateral hook members 28, 29 adjacent its front end, each hook member having a rear edge which is shaped to abut against, and partially embrace, the feet 13, 14. Extending rearwardly from the rear end of the frame member 23 are two pairs of straps 30, 30' and 31, 31', the straps of each pair being symmetrically disposed with respect to the longitudinal centre line of the frame members. The straps are rather more flexible than the body portion 27, which is relatively rigid, so that they can be flexed upwardly to a small degree. The straps 30, 30' are somewhat longer than the straps 31, 31'. Each of the straps is formed with an upwardly projecting button or stud 32, 33 which is positioned to engage one of the holes 18 (or 18') when the hook members 28, 29 are located in abutting engagement with the front pair of feet of a telephone base of the appropriate size. Each of the studs has a very short cylindrical stem at the end of which is a head portion of slightly larger diameter than the hole it is to engage, so that the stud may be snapped into the hole. When the studs are snapped into the holes, the frame member is securely attached to the underside of the telephone, being in effect suspended between the four points of attachment provided by the stud fastenings and the engagement of the hook members with the feet 13, 14.

Figure 1:
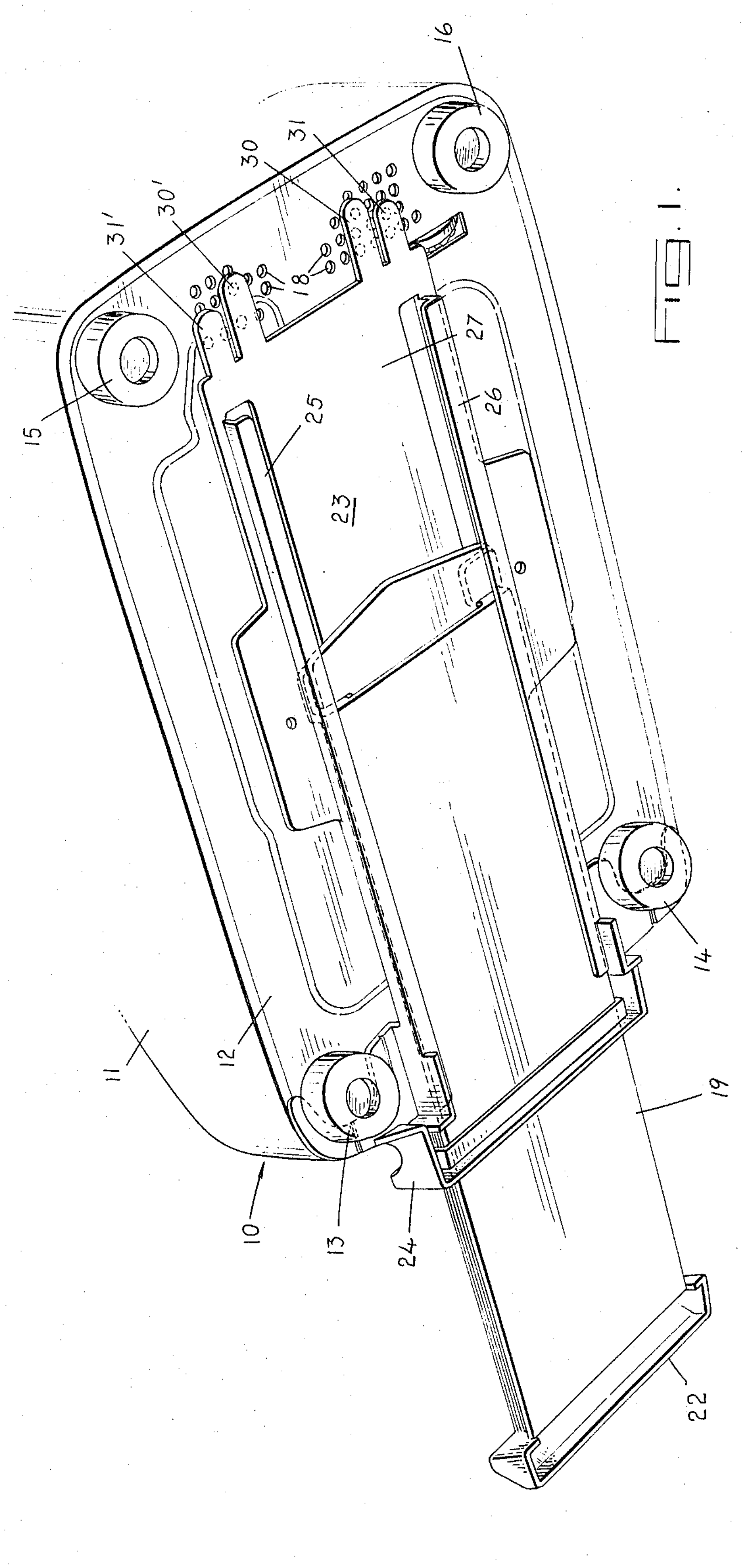

The studs 32, 33 need not be integral with the flexible straps 30, 31 as shown in FIG. 3, but may be separable, double-headed resilient studs adapted to snap into holes in the flexible straps or elsewhere in the frame member to be positioned thereby. Referring to FIGS. 4A and 4B, the frame member 27 is formed with holes 37, positioned to register with holes 38 in the underside of the telephone base when the frame member is located as shown in FIG 1. The holes 38 need not be adjacent the rear edge in this case, but may be elsewhere on the underside. The resilient studs 36 are snapped into the holes 37 so as to be positioned thereby for snapping engagement with the holes 38 as shown particularly in FIG. 4B.

What I claim as my invention is:

1. An index device for use with a telephone of the type having a generally rectangular base having front and rear edges, the base having an underside formed with an array of holes adjacent the rear edge and being mounted on supporting feet including a pair of laterally spaced feet adjacent the front edge, the device comprising an elongated drawer-like slide member adapted to carry index sheets, and a generally flat frame member constructed to support the slide member along the underside of the telephone base in drawer-like sliding manner therewith, the frame member comprising an elongated body portion of such a width as to extend between said pair of laterally spaced feet, a pair of lateral abutment portions adapted to engage said pair of feet, and a rearwardly extending flexible strap formed with an upwardly projecting resilient stud positioned to engage one of said holes when said abutment portions are located in abutting engagement with said pair of feet and adapted to snap into the hole to secure the frame member to said underside.

2. An index device according to claim 1, wherein the frame member has at least one pair of said flexible straps each formed with a resilient stud positioned to engage a respective one of said holes, the straps being symmetrically disposed with respect to the longitudinal centre line of the frame member.

3. An index device according to claim 2, wherein the frame member has two pairs of said flexible straps of different lengths which adapt the frame member to fit telephone bases of different sizes.

4. An index device according to claim 1 wherein the abutment portions are constituted by a pair of hook members extending laterally from the frame member adjacent its front end, each hook member having a rear edge shaped to abut against, and partialy embrace, a respective one of said feet.

5. An index device according to claim 1, the slide member being of rectangular configuration having a pair of longitudinally extending parallel marginal edges, wherein the frame member is formed with a transverse slot at its front end, the slide member extending through the slot, and a pair of integral, longitudinally extending, ledge portions adapted to support the slide member in drawer-like sliding relation to the frame member.

6. An index device according to claim 1, wherein the frame member is a unitary moulded structure of plastics material.

7. An index device for use with a telephone of the type having a generaly rectangular base having front and rear edges, the base having an underside formed with an array of holes and being mounted on supporting feet including a pair of laterally spaced feet adjacent the front edge, the device comprising an elongated drawer-like slide member adapted to carry index sheets, a generally flat frame member constructed to support the slide member along the underside of the telephone base in drawer-like sliding manner therewith, and resilient stud means for securing the frame member to said underside, the frame member comprising an elongated body portion of such a width as to extend between said pair of laterally spaced feet, a pair of lateral abutment portions adapted to engage said pair of feet, and said resilient stud means comprising at least one pair of resilient studs positioned by the frame member to engage respective ones of said holes when said abutment portions are located in abutting engagement with said pair of feet and adapted to snap into the holes to secure the frame member to said underside.

8. An index device according to claim 7, wherein the resilient studs are integral with the frame member.

9. An index device according to claim 7, wherein the resilient studs are separable from the frame member, the frame member providing at least one pair of holes into which the studs are snapped so as to be positioned thereby for engagement with the respective holes of said underside.

10. An index device for use with a telephone of the type having a generally rectangular base having front and rear edges, the base having an underside formed with an array of holes and being mounted on supporting feet including a pair of laterally spaced feet adjacent the front edge, the device comprising an elongated drawer-like slide member adapted to carry index sheets, a generally flat frame member constructed to support the slide member along the underside of the telephone base in drawer-like sliding manner therewith, the frame member comprising an elongated body portion of such a width as to extend between said pair of laterally spaced feet, and a pair of lateral abutment portions adapted to engage said pair of feet, the frame member further providing a pair of holes positioned to register with respective ones of said holes in the underside of the telephone base when said abutment portions are located in abutting engagement with said pair of feet, and a pair of resilient studs adapted to snap into said pair of holes and the registering holes in said underside for securing the frame member to said underside.

* * * * *